(12) United States Patent
Malley et al.

(10) Patent No.: US 10,359,082 B2
(45) Date of Patent: Jul. 23, 2019

(54) TORSIONAL DAMPER FOR A VEHICLE TRANSMISSION SYSTEM

(71) Applicant: VALEO EMBRAYAGES, Amiens (FR)

(72) Inventors: Matthieu Malley, Beauvais (FR); Adrien Nerriere, Amiens (FR)

(73) Assignee: Valeo Embrayages, Amiens (FR)

( * ) Notice: Subject to any disclaimer, the term of this patent is extended or adjusted under 35 U.S.C. 154(b) by 122 days.

(21) Appl. No.: 15/323,887

(22) PCT Filed: Jun. 24, 2015

(86) PCT No.: PCT/FR2015/051693
§ 371 (c)(1),
(2) Date: Jan. 4, 2017

(87) PCT Pub. No.: WO2016/001528
PCT Pub. Date: Jan. 7, 2016

(65) Prior Publication Data
US 2017/0138412 A1    May 18, 2017

(30) Foreign Application Priority Data

Jul. 4, 2014  (FR) ..................... 14 56420

(51) Int. Cl.
*F16D 13/68* (2006.01)
*F16F 15/123* (2006.01)

(52) U.S. Cl.
CPC ........ *F16D 13/686* (2013.01); *F16F 15/1234* (2013.01); *F16D 2300/22* (2013.01)

(58) Field of Classification Search
CPC ...................... F16D 13/686; F16D 2300/22; F16F 15/1234
See application file for complete search history.

(56) References Cited

U.S. PATENT DOCUMENTS

| 5,456,634 | A | * | 10/1995 | Maucher | ........... F16F 15/13164 464/68.8 |
| 5,667,042 | A | * | 9/1997 | Olsen | ...................... F16H 45/02 192/206 |

(Continued)

FOREIGN PATENT DOCUMENTS

| DE | 19611507 A1 | 10/1996 |
| FR | 2599800 A1 | 12/1987 |

(Continued)

*Primary Examiner* — David J Hlavka
(74) *Attorney, Agent, or Firm* — Berenato & White, LLC

(57) ABSTRACT

A torsional damper for vehicle transmission systems comprises an input element rotationally movable around an axis and exhibiting at least one window comprising two angularly spaced lateral edges and a radially external edge. An output element is rotationally movable around the axis and exhibits at least one window comprising two angularly spaced lateral edges and a radially external edge. An elastic return member capable of being received simultaneously in the window of the input element and the window of the output element generates a force acting against rotation of the output element with respect to the input element. An additional element is rotationally movable around the axis and integral with one of the input element and output element. The additional element exhibits an edge comprising at least one region projecting radially into the window of the input element and output element with which the additional element is integral.

19 Claims, 2 Drawing Sheets

(56) References Cited

U.S. PATENT DOCUMENTS

| | | | | |
|---|---|---|---|---|
| 5,685,407 A | * | 11/1997 | Rudolph | F16D 1/112 192/70.13 |
| 5,771,998 A | * | 6/1998 | Olsen | F16H 45/02 192/103 F |
| 5,823,516 A | | 10/1998 | Despres | |
| 6,004,213 A | * | 12/1999 | Nagano | F16F 15/12313 464/64.1 |
| 6,332,843 B1 | * | 12/2001 | Hashimoto | F16F 15/1232 192/205 |
| 9,216,733 B2 | * | 12/2015 | Gotoda | B60W 20/10 |
| 9,746,035 B2 | * | 8/2017 | Hennebelle | F16F 15/12373 |
| 2008/0236983 A1 | * | 10/2008 | Kummer | F16D 21/06 192/48.611 |
| 2009/0166146 A1 | * | 7/2009 | El Haddad | F16F 15/1238 192/213.2 |
| 2013/0256088 A1 | * | 10/2013 | Tanaka | F16D 13/58 192/203 |
| 2015/0240881 A1 | * | 8/2015 | Bibby | F16F 15/00 192/203 |
| 2017/0184163 A1 | * | 6/2017 | Kirkpatrick | F16D 65/0006 |

FOREIGN PATENT DOCUMENTS

| | | |
|---|---|---|
| FR | 2732426 A1 | 10/1996 |
| FR | 2794505 A1 | 12/2000 |
| GB | 2194019 B | 12/1989 |

* cited by examiner

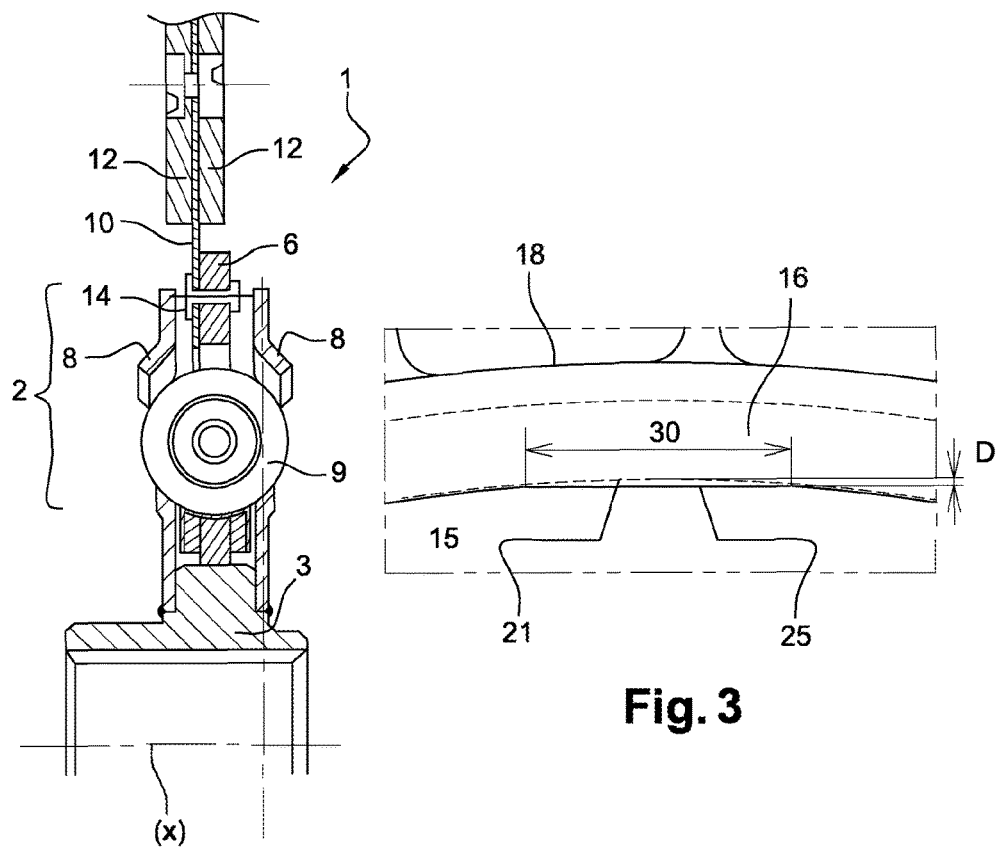
Fig. 1
Fig. 3
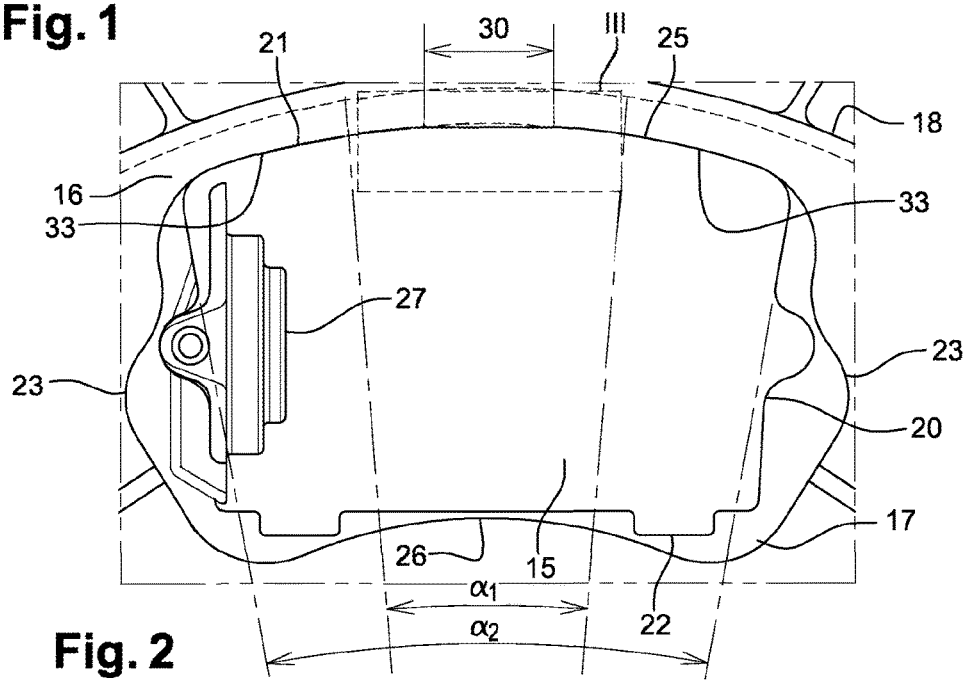
Fig. 2

TORSIONAL DAMPER FOR A VEHICLE
TRANSMISSION SYSTEM

CROSS-REFERENCE TO RELATED
APPLICATIONS AND CLAIM TO PRIORITY

This application is a national stage application of International Application No. PCT/FR2015/051693 filed Jun. 24, 2015, which claims priority to French Patent Application No. 1456420 filed Jul. 4, 2014, the disclosures of which are incorporated herein by reference and to which priority is claimed.

FIELD OF THE INVENTION

The present invention relates to a torsional damper for a vehicle transmission system.
The invention is applicable in particular, but not exclusively, to so-called "industrial" vehicles, the latter being, for example, trucks, public transit vehicles, or agricultural vehicles.

BACKGROUND OF THE INVENTION

In order to improve the filtering performance of a torsional damper, one can opt to use longer and wider springs and to arrange them along longer installation radii in windows of the damper. In the case in which that damper is integrated into a friction disk for a clutch, the springs generate a force acting against rotation of the guide washers of the disk with respect to a web of the disk. With a dimension and positioning of this kind, at high rotation speeds of the vehicle's engine the springs produce large centrifugal forces, capable of damaging the web and/or the guide washers along with the radially external edges of the windows with which they come into contact. This contact can in fact generate significant wear on, and even breakage of, these parts as well as hysteresis peaks that affect the filtering performance of the damper.
In order to solve this problem it is known, for example from the Application FR 2 732 426, to equip each angular end of a spring with a seat that comes into abutment against the web in order to absorb the centrifugal forces. Such seats do not make it possible, however, to prevent the springs from coming into contact with the radially external edges of the windows of the web or of the guide washers above a certain engine rotation speed.
There is a need to reduce wear on those element(s) of the damper with which the springs can come into contact in response to centrifugal forces associated with rotation of the vehicle's engine, including at high rotation speeds.

SUMMARY OF THE INVENTION

The invention aims to meet that need and does so, according to one of its aspects, with the aid of a torsional damper for a vehicle transmission system, comprising:
an input element rotationally movable around an axis and exhibiting at least one window comprising two angularly spaced lateral edges and a radially external edge;
an output element rotationally movable around the axis and exhibiting at least one window comprising two angularly spaced lateral edges and a radially external edge, an elastic return member being capable of being received simultaneously in the window of the input element and in the window of the output element so as to generate a force acting against rotation of the output element with respect to the input element; and
an additional element rotationally movable around the axis and integral with one of the input element and output element, the additional element exhibiting at least one edge, said edge of the additional element comprising at least one region projecting radially into the window of that one of the input element and output element with which the additional element is integral.
According to the invention, that region projecting from the edge of the additional element can then come into contact with the elastic return element when the latter is subjected to large centrifugal forces, said contact replacing the contact according to the existing art between the elastic return member and the radially external edge of the window of the input element or output element. Thanks to this contact, the invention thus allows the centrifugal forces applied onto the elastic return element to be supported in part by the additional element, in contrast to the case in which those forces are supported in their entirety by the input element or output element against an edge with which the elastic return member comes into contact. The input element and/or output element is thus protected from the aforementioned wear problems. The centrifugal strength of the input element and/or output element of the damper is thus improved.
The elastic return member, by coming into contact with said region of the edge of the additional element, thus can no longer come into contact with edges of the input element and output element, thereby protecting each of the latter.
The radially external edge of the window of that one of the input element and output element which is integral with the additional element comes into contact, for example, with the elastic return member outside the radial space opposite said region of the additional element. At certain engine rotation speeds the elastic return member therefore comes into contact exclusively with the radially external edge of the window of the input element or output element, or jointly into contact with the radially external edge of the window of the input element or output element and with said region of the edge of the additional element.
That edge of the additional element in which said projecting region is configured can be the radially external edge of a window furthermore comprising two angularly spaced lateral edges.
The additional element exhibits, for example, several windows. The additional element can be in a single piece and can extend entirely around the axis.
According to an embodiment of the invention, the additional element of the torsional damper can be rotationally integral with the input element. In such a case the additional element is rotationally movable with respect to the output element. The additional element of the torsional damper is, for example, axially offset with respect to the input element.
According to another embodiment of the invention, the additional element of the torsional damper is rotationally integral with the output element. In such a case the additional element is rotationally movable with respect to the input element.
For purposes of the present Application, "axially" means "parallel to the rotation axis," "radially" means "along an axis belonging to a plane perpendicular to the rotation axis and intersecting that rotation axis," and "angularly" or "circumferentially" means "around the rotation axis."
The damper can comprise an elastic return member received simultaneously in the window of the input element and in the window of the output element so as to generate a force acting against rotation of the output element with respect to the input element, the elastic return member also being received radially internally with respect to said edge of the additional element, in particular in the window of the additional element. A return member of this kind allows filtering of the torsional oscillations that propagate in the vehicle transmission system. That return member can have ends capable of coming into abutment against the lateral edges of the corresponding window of the input element and the corresponding window of the output element. Each elastic return member is, for example, a curved or straight spring. As appropriate, each elastic return member can be constituted by two springs in parallel or in series, or by branches, in parallel, of springs in series.

Each angular end of the elastic return member can be in contact with a seat.

When the damper is inactive, each seat comes into abutment simultaneously against a lateral edge of the window receiving said elastic return element of the input element, and against a lateral edge of the window receiving said elastic return member of the output element. For purposes of the present Application, the damper is "inactive" when it is not transmitting any torque.

In the other positions of the damper, one of the seats comes into abutment against a lateral edge of the window receiving said elastic return member of the input element, and the other seat comes into abutment against a lateral edge of the window receiving said elastic return member of the output element.

Those seats can absorb a portion of the centrifugal forces exerted on the elastic return member.

Advantageously, installation of the elastic return member in the input element and in the output element is accomplished under a preload, so that the elastic return member cannot come loose or occupy an undesired position.

Preferably, the edge region of the additional element, being in particular the radially external edge of the window of said additional element, projecting into the window of that one of the input element and output element with which the additional element is integral, is a central region of said edge. This central region is located, for example, at mid-length on that edge, in particular halfway between the two lateral edges of said window. Thanks to this location of this region at the center of said edge of the additional element, this projecting region comes into contact with the elastic return member only when the latter is subjected to large centrifugal forces. The projecting region thus does not interfere with the trajectory of the elastic return member when the latter is subjected only to small centrifugal forces, unlike what would occur if the projecting region were arranged close to an angular end of that edge of the additional element.

The projecting region can be rectilinear.

As a variant, said projecting region can be non-rectilinear, for example concave, convex, or otherwise.

The projecting region can be symmetrical with respect to a plane that can be a median plane for the edge in which that region is configured, in particular a median plane for the window whose edge constitutes the radially external edge. A projecting region of this kind thus ensures contact, with identical characteristics, between the additional part and the elastic return member when subjected to centrifugal forces in both rotation directions around the axis.

The projecting region can extend continuously along a portion of said edge, the latter being in particular the radially external edge of the additional element. As a variant, this region can extend discontinuously, several different subregions then succeeding one another angularly.

The ratio between the angle measured from the rotation axis between the angular ends of said projecting region, and the angle measured from the rotation axis between the angular ends of the edge of the additional element in which that region is configured, the latter being in particular the radially external edge of a window of the additional element, can be between 0.15 and 0.5, being in particular between 0.15 and 0.30. This projecting region can therefore require only a very local modification of the shape of said edge, the latter being in particular the radially external edge of the window of the additional element.

The maximum distance that said region projects into the window of that one of the input element and output element with which the additional element is integral can be at least 0.2 mm. This maximum distance is measured between said edge of the additional element, being in particular the radially external edge of the window of the additional element, and the radially external edge of the element with which it is integral, at the center of said region and orthogonally thereto. This maximum distance value is particularly adapted for coming into contact via said region, upon deformation of the elastic return member when it is subjected to centrifugal forces, with that elastic return member.

The ratio between the maximum value for the projection of the region and the maximum radial dimension of the input element or output element with which the additional element is integral can be between 0.003 and 0.01.

The rigid connection between the additional element and that one of the input element and output element with which the additional element is integral comprises, for example, rivets.

As a variant, that rigid connection comprises local welding of that portion of the additional element defined radially internally by said edge of the additional element, the latter being in particular the radially external edge of the window of the additional element, and of that portion of the input element or output element defined radially internally by the radially external edge of its window. In the latter case, the connection can be produced by spot welds or a local weld.

In another variant, the rigid connection comprises both the rivets and the local weld mentioned above.

In all of the above, the window of the input element and/or the window of the output element and/or the window of the additional element can exhibit a continuous periphery, for example having a radially internal edge substantially opposite the radially external edge and connecting the lateral edges of said window.

In this case the radially internal edge of the window configured in the additional element can comprise at least one region radially behind the radially internal edge of the window configured in that one of the input element and output element which is integral with said additional element.

The input element can exhibit a plurality of windows succeeding one another angularly, each window comprising two angularly spaced lateral edges and a radially external edge; the output element can exhibit a plurality of windows succeeding one another angularly, each window comprising two angularly spaced lateral edges and a radially external edge; and the additional element can exhibit a plurality of windows, each window comprising two angularly spaced lateral edges and a radially external edge. Each window of the additional element can then be axially opposite at least a portion of a window of the output element and at least a portion of a window of the input element.

An elastic return element is received, for example, in a window of the input element, in a window of the output element, and this return element is then capable of coming into contact with the projecting region of a window of the additional element.

Each element of the damper comprises between one and six windows, for example four windows.

Each window configured in the additional element can extend over an angular sector, measured from the axis of the hub between two angular ends of the radially external edge of said window, which is greater than the value of the angular sector measured from that same axis of the hub between two angular ends of the radially external edge of the window of that one of the input element and output element which is integral with the additional element.

The damper is capable, for example, of being integrated into a friction disk for a clutch, the input element being constituted by a web, the output element being constituted by two guide washers axially surrounding the web, and the additional element being constituted by a support disk capable of supporting at least one friction lining, in particular friction linings, in particular all the friction linings, of the friction disk. The two guide washers are advantageously integrated via rivets.

When the additional element is a support disk integral with the web of the damper, the term "symmetrical disk" is used. The web is then situated axially in the space delimited by the two guide washers.

As a variant, when the additional element is a support disk integral with the guide washers, the term "asymmetrical disk" is used.

A further object of the invention, in accordance with another of its aspects, is a friction disk for a clutch, comprising:
 a hub extending along an axis;
 a torsional damper as defined above; and
 at least one friction lining carried by the support disk of the damper.

The axis along which said hub extends can be indistinguishable from the rotation axis of the input elements.

The disk can comprise two friction linings. Only one of them can be carried by the support disk. As a variant, each friction lining is carried by the support disk.

BRIEF DESCRIPTION OF THE DRAWINGS

A better understanding of the invention will be gained from reading the description below of a non-limiting exemplifying embodiment thereof and from an examination of the attached drawings, in which:

FIG. 1 schematically depicts a disk of a friction disk comprising a damper according to an exemplifying embodiment of the invention;

FIG. 2 is a view, along the axis of the disk, of a region thereof;

FIG. 3 depicts detail III of FIG. 2; and

DETAILED DESCRIPTION OF THE PREFERRED EMBODIMENT(S)

Figure 4:
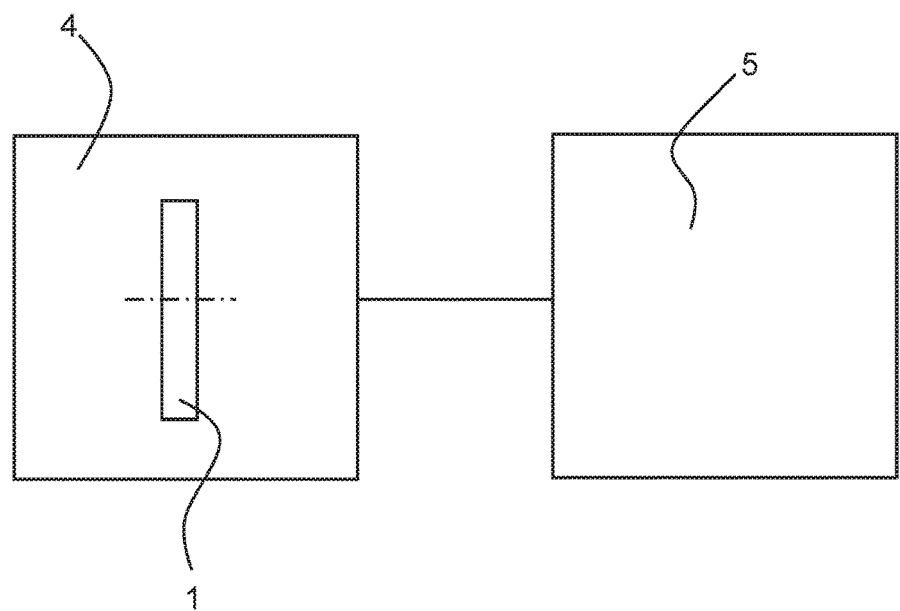
FIG. 4 depicts a clutch provided with the friction disk and connected to a gearbox.

FIGS. 1 and 4 depict a friction disk 1 provided for a clutch 4 and equipped with a torsional damper 2 according to an exemplifying embodiment of the invention. This friction disk 1 comprises a hub 3 extending along an axis X. The hub 3 is installed, for example, on a region of an input shaft of a gearbox 5 and is rotationally integral with the input shaft thereof, as shown in FIG. 4.

In known fashion, damper 2 comprises an input element 6 and an output element 8 between which is interposed an elastic return member 9, the latter allowing a limited rotational displacement between the input element 6 and the output element 8. In the example described, the input element 6 is constituted by a web rigidly (i.e., non-moveably) coupled to a support disk 10 for friction linings 12. The support disk 10 constitutes an additional element for damper 2. The web 6 is rigidly (i.e., non-moveably) coupled to the support disk 10, for example, with the aid of rivets 14.

As is evident from FIG. 1, output element 8 is constituted here by two axially offset guide washers arranged axially around web 6. Guide washers 8 are integral and are rotationally fastened on hub 3, for example by means of splines.

In the example considered, damper 2 comprises a plurality of elastic return members 9 succeeding one another angularly, each elastic return element 9 being, in this example, received concurrently
 in a window 15 configured in web 6,
 in a window 17 configured in support disk 10, and
 in a window configured in guide washers 8.

Windows 15 and 17 will now be described in further detail with reference to FIG. 3, in which guide washers 8 are not depicted for reasons of clarity.

Once the web 6 and the support disk 10 have been integrated with the aid of rivets 14, each window 15 of the web 6 is axially and radially opposite the window 17 of the support disk 10. As shown in FIG. 1, each the window 17 of the support disk 10, each window 15 of the input element 6 and each window of the output element 8 is radially spaced from the axis X and axially spaced from one another.

Each window 15 configured in web 6 is delimited on the one hand by:
 two angularly spaced lateral edges 20, and
 a radially external edge 21 and a radially internal edge 22.

Radially external edge 21 of a window 15 delimits a strip 16 of the web extending to radially external edge 18 of said web 6. In addition to the use of rivets 14 for rigidly coupling web 6 and support disk 10, each strip 16 of the web can be fastened by local welding to that portion of support disk 10 which is axially and radially opposite the latter.

Each window 17 is delimited on the one hand by:
 two angularly spaced lateral edges 23, and
 a radially external edge 25 and a radially internal edge 26.

As is evident from FIG. 2, here the edges of windows 15 and 17 are not rectilinear. In FIG. 2, the edges of window 17 configured in support disk 10 exhibit curved regions. In FIG. 2, radially internal edge 22 of window 15 configured in support disk 10 exhibits a succession of slots.

In the example depicted, radially internal edge 26 of window 17 configured in support disk 10 is, over its entire length, radially behind radially internal edge 22 of window 15 configured in web 6. In other words, edge 22 here projects over its entire length into window 17 configured in support disk 10.

As depicted in FIG. 3, each window 15 configured in web 6 extends over an angular sector, measured from axis X of the hub between two angular ends of radially external edge 21, that is less than the value of the angular sector measured from that same axis X between two angular ends of radially external edge 25 of the opposite window which is configured in support disk 10.

In the example considered, each elastic return member 9 is a spring extending between two angular ends, each angular end coming into abutment against:
- web 6,
- support disk 10, and
- guide washers 8.

In the example of FIG. 2, each angular end of spring 9 comes into contact with a seat 27. When damper 2 is in active, each seat 27 comes into abutment simultaneously against web 6 at a lateral edge 20 of window 15 configured in that web 6, and against guide washers 18 at a lateral edge of the windows configured in those guide washers 18.

As is evident from FIG. 3, radially external edge 25 of window 17 configured in support disk 10 comprises a region 30 projecting radially into window 15 configured in web 6. In the example depicted, region 30 is a central region of radially external edge 25 of window 17 configured in support disk 10. Region 30 here is unique, i.e. outside that region 30, radially external edge 25 of window 17 does not project into window 15 configured in web 6. Region 30 of the example considered is moreover rectilinear. In the example of FIG. 2, the remainder of radially external edge 25 of window 17 is constituted by concave regions 33.

Region 30 has a short length with respect to the total length of radially external edge 25; the ratio here between the angle $\alpha_1$ measured from axis X between the angular ends of said region 30, and the angle $\alpha_2$ measured from that same axis X between the angular ends of radially external edge 25 of window 17 configured in support disk 10, is between 0.15 and 0.5, being in particular between 0.15 and 0.30.

Furthermore, the maximum distance D by which region 30 projects into window 15 configured in web 6 is equal here to at least 0.2 mm. As is evident from FIG. 3, this maximum distance D is measured, between radially external edges 21 and 25 at the center of region 30, orthogonally to said region 30.

When web 6 is rotationally displaced in response to a torque exerted by the combustion engine associated with the transmission system into which friction disk 1 is integrated, that web 6 displaces each elastic return member 9 on which centrifugal forces are exerted. As long as the centrifugal forces remain below a given value, elastic return member 9 does not come into contact with region 30 of radially external edge 25 of the window configured in support 10, which projects into window 15 configured in the web. The presence of regions 30 does not change the functioning of friction disk 1.

When the centrifugal forces exerted on each elastic return member become too large, the elastic return member becomes displaced radially in window 15 until it comes into contact with region 30 of radially external edge 25 of window 17 configured in support disk 10. Thanks to that contact, support disk 10, which is more solid than web 6, absorbs a portion of the centrifugal forces that according to the existing art are applied only onto web 6. Support disk 10 thus plays the part of an additional element of damper 2, reducing the risk of wear on web 6.

The invention is not limited to what has just been described. In other examples that are not depicted, the input element of damper 2 is constituted by guide washers with which support disk 10 is integrated, the output element of damper 2 being constituted by web 6. In this case, region 30 of radially external edge 25 of window 17 configured in support disk 10 projects into the window configured in the guide washer.

In other examples, support disk 10 has no windows, edge 25 then being an edge of that disk 10.

The expression "comprising a/an/one" must be understood as a synonym of the expression "comprising at least a/an/one," unless specified to the contrary.

The invention claimed is:

1. A torsional damper (2) of a friction disk (1) for a clutch for a vehicle transmission system, the torsional damper (2) comprising:
   an input element (6) rotationally movable around an axis (X) and exhibiting at least one window (15) comprising two angularly spaced lateral edges (20) and a radially external edge (21);
   an output element (8) rotationally movable around the axis (X) and exhibiting at least one window comprising two angularly spaced lateral edges and a radially external edge,
   an elastic return member (9) received simultaneously in the at least one window (15) of the input element (6) and in the at least one window of the output element (8) so as to generate a force acting against rotation of the output element (8) with respect to the input element (6); and
   a support disk (10) rotationally movable around the axis (X) and non-moveably attached to one of the input element (6) and the output element (10), the support disk (10) exhibiting at least one window (17) comprising at least one edge (25), the at least one edge (25) comprising at least one region (30) projecting radially into the at least one window of one of the input element (6) and output element (8) to which the support disk (10) is non-moveably attached,
   the input element (6) being a web, the output element (8) being two guide washers axially surrounding the web, and
   the support disk extending radially outwardly from the one of the input element (6) and the output element (10), the support disk (10) supporting at least one friction lining.

2. The torsional damper (2) according to claim 1, wherein the support disk (10) is integral with the input element (6).

3. The torsional damper (2) according to claim 1, wherein the elastic return member (9) is also received radially internally with respect to the at least one edge (25) of the support disk (10).

4. The torsional damper (2) according to claim 3, wherein each angular end of the elastic return member (9) is in contact with a seat (27).

5. The torsional damper (2) according to claim 1, wherein the at least one region (30) of the at least one edge (25) of the support disk (10) is a central region of the at least one edge (25).

6. The torsional damper (2) according to claim 1, wherein the at least one region (30) of the at least one edge (25) of the support disk (10) is rectilinear.

7. The torsional damper (2) according to claim 1, wherein a ratio between an angle ($\alpha_1$) measured from the axis (X) between angular ends of the at least one region (30), and an angle ($\alpha_2$) measured from the axis (X) between angular ends of the at least one edge (25) of the support disk (10) in which the at least one region (30) is configured, is between 0.15 and 0.5.

8. The torsional damper (2) according to claim 1, wherein a maximum distance (D) that the at least one region (30) projects into the at least one window of the one of the input element (6) and output element (8) with which the support disk (10) is integral is at least 0.2 mm.

9. The torsional damper (2) according to claim 1, wherein the support disk (10) is non-moveably connected to one of the input element (6) and the output element (8) by one of rivets (14) and a weld so as to form a rigid connection between the support disk (10) and one of the input element (6) and the output element (8).

10. The torsional damper (2) according to claim 9, wherein the weld is a local weld of a portion of the support disk (10) defined radially internally by the at least one edge (25) of the support disk (10), and a portion of the input element (6) or the output element (8) defined radially externally by the radially external edge of the at least one window of the input element (6) or the output element (8).

11. The torsional damper (2) according to claim 1, wherein:
the input element (6) exhibiting a plurality of windows (15) succeeding one another angularly;
the output element (8) exhibiting a plurality of windows succeeding one another angularly; and
the support disk (10) exhibiting a plurality of windows (17), each window (17) comprising two angularly spaced lateral edges (23) and the at least one edge (25), the at least one edge (25) is a radially external edge (25) in which the at least one region (30) is configured, and
wherein each window (17) of the support disk (10) being axially opposite at least a portion of one of the windows of the output element (8) and at least a portion of one of the windows (15) of the input element (6).

12. A friction disk (1) for a clutch, comprising:
a hub (3) extending along an axis;
a torsional damper (2) according to claim 1; and
at least one friction lining (12) carried by the support disk (10) of the torsional damper (2).

13. The torsional damper (2) according to claim 2, wherein the elastic return member (9) also received radially internally with respect to the at least one edge (25) of the support disk (10).

14. The torsional damper (2) according to claim 3, wherein each angular end of the elastic return member (9) is in contact with a seat (27).

15. The torsional damper (2) according to claim 2, wherein the at least one region (30) of the at least one edge (25) of the support disk (10) is a central region of the at least one edge (25).

16. The torsional damper (2) according to claim 3, wherein the at least one region (30) of the at least one edge (25) of the support disk (10) is a central region of the at least one edge (25).

17. The torsional damper (2) according to claim 4, wherein the at least one region (30) of the at least one edge (25) of the support disk (10) is a central region of the at least one edge (25).

18. The torsional damper (2) according to claim 1, wherein the at least one window (17) of the support disk (10) is radially spaced from the axis (X).

19. The torsional damper (2) according to claim 1, wherein the at least one window (17) of the support disk (10), the at least one window (15) of the input element (6) and the at least one window of the output element (8) are radially spaced from the axis (X) and axially spaced from one another.

* * * * *